Figure 1:
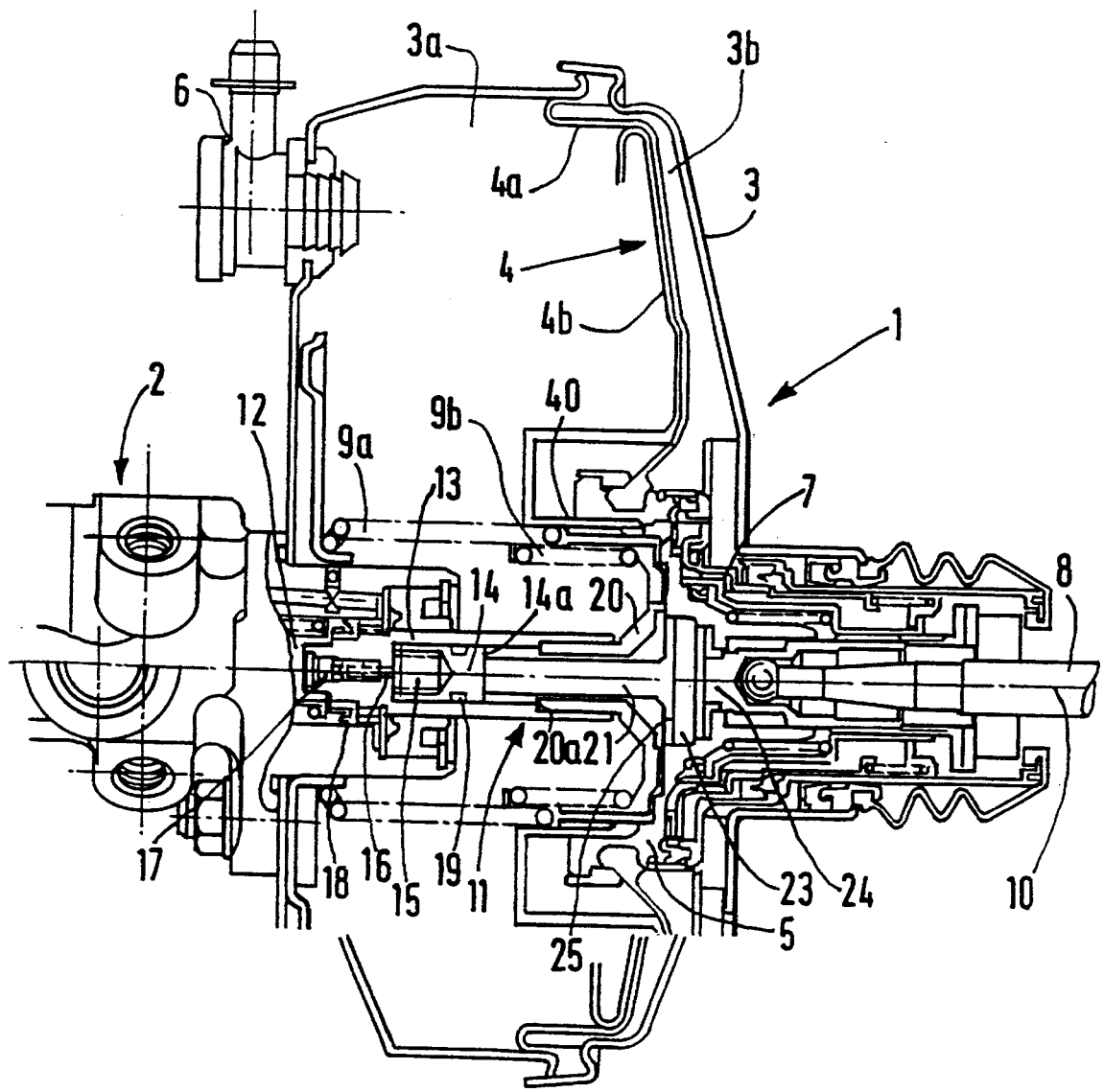

United States Patent [19]

Castel et al.

[11] Patent Number: 5,572,870
[45] Date of Patent: Nov. 12, 1996

[54] BOOSTED BRAKE DEVICE WITH CONCEALED TRAVEL AND GUARANTEED GAIN

[75] Inventors: Philippe Castel, Paris; Olivier Castello, Bondy, both of France

[73] Assignee: AlliedSignal Europe Services Techniques, Drancy, France

[21] Appl. No.: 341,544

[22] PCT Filed: Oct. 13, 1994

[86] PCT No.: PCT/FR94/01187

§ 371 Date: Nov. 21, 1994

§ 102(e) Date: Nov. 21, 1994

[87] PCT Pub. No.: WO95/14597

PCT Pub. Date: Jun. 1, 1995

[30] Foreign Application Priority Data

Nov. 29, 1993 [FR] France ..................... 93 14225

[51] Int. Cl.⁶ ..................... B60T 13/20; F15B 9/10
[52] U.S. Cl. ..................... 60/553; 60/554; 91/369.2
[58] Field of Search ..................... 91/369.1, 369.2; 60/553, 554, 555, 556

[56] References Cited

U.S. PATENT DOCUMENTS

| | | | |
|---|---|---|---|
| 3,159,975 | 12/1964 | Ayers, Jr. ..................... | 60/553 X |
| 3,540,219 | 11/1970 | Hurata et al. ..................... | 60/553 |
| 3,559,406 | 2/1971 | Gardner ..................... | 60/553 |
| 3,914,941 | 10/1975 | Gardner ..................... | 60/553 |
| 3,937,021 | 2/1976 | Sisco et al. ..................... | 60/553 X |
| 4,417,445 | 11/1983 | Furuta ..................... | 91/369.3 X |
| 4,693,083 | 9/1987 | Reinartz ..................... | 60/554 X |
| 5,475,977 | 12/1995 | Gautier et al. ..................... | 91/369.1 X |
| 5,487,271 | 1/1996 | Gautier et al. ..................... | 60/554 |

FOREIGN PATENT DOCUMENTS

| | | | |
|---|---|---|---|
| 55-47942 | 4/1980 | Japan ..................... | 91/369.1 |
| 92/01594 | 2/1992 | WIPO ..................... | 60/554 |

*Primary Examiner*—John E. Ryznic
*Attorney, Agent, or Firm*—Leo H. McCormick, Jr.

[57] ABSTRACT

A brake device having a pneumatic brake booster and a master cylinder. The master cylinder operates in response to a combined actuation force derived from a boost force and an input force. The input force is applied to a control rod for opening a valve to develop a pressure differential across a partition. The pressure differential acts on the partition to develop the boost force which is transmitted through a first hydraulic piston retained in the master cylinder. A movable pneumatic piston which carries the control rod is connected to the hydraulic piston and after an initial travel during which the valve is opened acts directly on the hydraulic piston to provide a portion of said actuation force. The input of the pneumatic piston to the hydraulic piston provides a way to operate a master cylinder in response to an input force in the event of a failure of a hydraulic circuit connected to the master cylinder.

2 Claims, 2 Drawing Sheets

5,572,870

BOOSTED BRAKE DEVICE WITH CONCEALED TRAVEL AND GUARANTEED GAIN

The present invention relates to a boosted brake device for a motor vehicle, comprising, on the one hand, a master cylinder filled with a brake fluid and equipped with a main hydraulic piston intended to receive an actuation force composed of an input force and a boost force both acting in an axial direction, and, on the other hand, a pneumatic booster capable of being activated by applying the said input force to a control rod controlling the opening of a valve, in order to exert the actuation force on the main hydraulic piston, the booster comprising a rigid casing separated in leaktight fashion into two chambers by means of at least one movable partition, capable, under the effect of a pressure difference established between the two chambers by opening the valve, of moving in the same direction as a pneumatic piston carrying the valve and itself also capable of moving with respect to the casing, the input force being transmitted via a reaction disk on which the pneumatic piston also bears in order to supply to it at least part of the boost force.

A device of this type is well known in the prior art and is described in, for example, U.S. Pat. No. 4,491,058.

Such a braking device has the advantage, resulting from the use of a pneumatic piston which can move with respect to the rigid casing, that the total travel available for the control rod, and therefore for the brake pedal, is relatively long, which constitutes a condition necessary for ensuring optimum control of the deceleration of the vehicle during braking.

However, this condition, although necessary, is not sufficient and this control is lessened in current boosted braking devices by the fact that to obtain the minimum pressure necessary to start braking requires a very long initial travel of the control rod.

The object of the present invention is to allow an optimization of the control, by the driver of a vehicle, of the deceleration of the latter by proposing a boosted braking device, the effectiveness of which is manifested right from the onset of braking that is to say after a very short initial travel of the brake pedal.

To this end, the device of the present invention is essentially characterized in that the movable partition is mounted so that it can slide freely with respect to the pneumatic piston, in that the main hydraulic piston of the master cylinder itself includes a hollow movable cylinder which communicates with the master cylinder which is secured to the movable partition, and inside which there slides, in leaktight fashion and in the axial direction, a secondary hydraulic piston capable of receiving at least the said input force coming from the reaction disk, and in that the free sliding of the movable partition with respect to the pneumatic piston is limited, for a movement of this partition toward the master cylinder, by the secondary hydraulic piston being driven in this same direction, by the movable cylinder.

According to a preferred embodiment of the invention, the movable cylinder exhibits an internal stop capable of interacting with the secondary hydraulic piston in order to drive the latter.

Apart from the advantages already outlined and the simplicity of manufacturing and adjustment to which they lead, these features make it possible, on the one hand, to ensure that any failure of the primary hydraulic circuit still has no consequence on the value of the amplification ratio of the booster and, on the other hand, to adjust the respective hydraulic sections of the movable cylinder and of the secondary hydraulic piston independently of the value of this amplification ratio.

Figure 2:
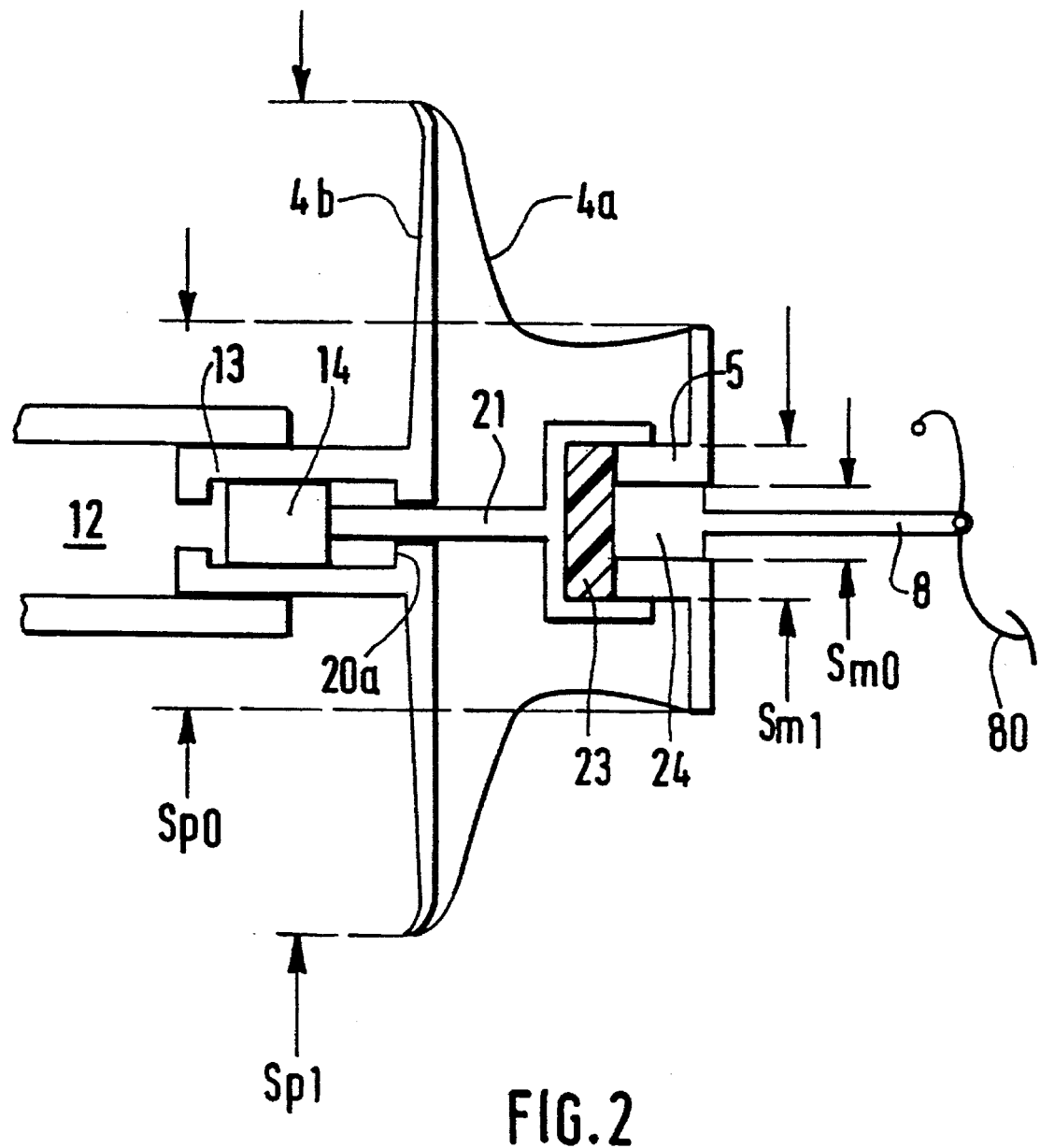

Other features and advantages of the invention will emerge clearly from the description which is given hereinafter, by way of indication and without any limitation, with reference to the appended drawings, in which:

FIG. 1 is a partial sectional view of a device in accordance with the invention; and FIG. 2 is a diagrammatic and partial sectional view of the same device.

Insofar as the invention only relates to an improvement made to braking systems with pneumatic boosting, and the general constitution and operation of the latter are well known to the person skilled in the art, these systems will only be recalled here rapidly to allow total understanding of the improvement which the invention represents.

Diagrammatically, a system of this type comprises a booster 1 and a master cylinder 2.

The booster itself comprises a rigid casing 3 separated into two chambers 3a and 3b in a leaktight fashion, by a movable partition 4 comprising a membrane 4a and a rigid skirt 4b and capable of accompanying the movement of a pneumatic piston 5 which can move inside the casing 3 toward the master cylinder 2.

The front chamber 3a, whose front face is closed in leaktight fashion by the master cylinder 2, is permanently connected to a vacuum source (not shown) via a non-return valve 6.

The pressure in the back chamber 3b is controlled by a valve 7, controlled by a control rod 8 which is connected to a brake pedal 80 (FIG. 2).

When the control rod 8 is in the rest position, in this case pulled toward the right, the valve 7 establishes a communication between the two chambers 3a and 3b of the booster or comes from a position in which this communication is established.

Since the back chamber 3b is therefore subjected to the same vacuum as the front chamber 3a, the piston 5 is pushed back toward the right, into the rest position, by a spring 9a, while a spring 9b pushes the rigid skirt 4b back in the same fashion.

Actuation of the control rod 8 toward the left has the effect, in a first instance, of moving the valve 7 so that it isolates the chambers 3a and 3b from one another, then, in a second instance, of moving this valve so that it opens the back chamber 3b to atmospheric pressure.

The pressure difference between the two chambers therefore sensed by the membrane 4a exerts a thrust on the movable partition 4 and on the piston 5, which tends to move them toward the left, thereby compressing the springs 9a, 9b.

The braking effort exerted on the control rod 8, or "input force", and the brake boost effort, or "boost force", resulting from the thrust of the movable partition 4, are therefore applied together along the axis 10 of the thrust rod 8 toward the master cylinder 2, and join together in order to constitute the force for actuating the latter.

More precisely, the actuation force is applied to the main hydraulic piston 11 of the master cylinder and causes it to move toward the left (in the figure), which leads to a rise in pressure of the brake fluid present in the internal volume 12 of the master cylinder, and an actuation of the brake connected to the latter.

The main hydraulic piston 11 is, in fact, composite and comprises, on the one hand, a movable and hollow cylinder 13 and, on the other hand, a secondary hydraulic piston 14.

The internal volume 15 of the movable cylinder 13 communicates with the internal volume 12 of the master cylinder by means of at least one orifice, such as 16, made in the movable cylinder in an axial direction, and of at least one non-return valve, such as 17, allowing the flow of brake fluid solely coming from inside 12 the master cylinder toward the inside 15 of the movable cylinder 13.

Apart from the passage of fluid which these passages 16 and 17 allow between the internal volume 12 of the master cylinder 2 and that of the movable cylinder 13, this movable cylinder 13 slides in leaktight fashion in the master cylinder 2, leaktightness being obtained by virtue at least of an annular seal 18.

The secondary hydraulic piston 14, for its part, slides inside the movable cylinder 13, which it blocks off in leaktight fashion by virtue of an annular seal 19.

Moreover, the movable cylinder 13 is secured to the rigid skirt 4b by means of the ring 20.

The secondary hydraulic piston 14 in fact consists of the axial extension of a thrust rod 21 capable of transmitting to it a part of the input force exerted on the control rod 8 and, on the other hand, a fraction of the boost force developed by the pneumatic piston 5, these forces being transmitted, in a way known per se, via a reaction disk 23, on one face of which there bear this pneumatic piston and a feeler 24 actuated by the control rod and the other face of which bears on a bearing surface 25 secured to the thrust rod 21.

The operation of the device described up until now is as follows.

When an input force is applied to the control rod 8, the secondary hydraulic piston 14 is urged to the left, tending to drive the movable cylinder 13 and/or to increase the pressure in the master cylinder.

After a predetermined travel of the thrust rod 8, the valve 7 opens the back chamber 3b of the booster, previously isolated from the front chamber 3a, to the atmosphere, and a boost force is applied to the movable cylinder 13 by the rigid skirt 4b via the ring 20.

The hydraulic pressure in the internal volume 12 of the master cylinder rises distinctly and becomes established, by a flow of hydraulic fluid through the passages 16 and 17, in the internal volume 15 of the movable cylinder, thus causing a force to appear on the secondary hydraulic piston 14, which force tends to push this secondary piston back toward the control rod 8, that is to say toward the right in FIG. 1.

According to the invention, the movable partition 4 is, preferably via the central part 40 of its rigid skirt 4b, mounted so that it can slide freely with respect the pneumatic piston 5 such that, in a first instance, it is able to advance alone toward the master cylinder 2, the free sliding of the movable partition being, however, limited by the fact that the secondary hydraulic piston 14 is driven by the movable cylinder 13 after a given travel of the movable wall toward the master cylinder.

For this purpose, the movable cylinder 13 exhibits, for example, an internal stop 20a formed by the ring 20 and capable of interacting with the internal peripheral rim 14a of the secondary hydraulic piston 14 in order to ensure the driving of the latter by the skirt 4b after an initial free travel of this skirt.

The principle of the invention is represented diagrammatically in FIG. 2, in which the various components appear with the same reference numerals as in FIG. 1.

If $Sm0$ denotes the cross section of the feeler 24, $Sm1$, the input cross section of the reaction disk 23, $Sp0$ the cross section of the piston 5 subjected to the pressure difference between the two chambers 3a and 3b, and $Sp1$ the total cross section of the skirt 4b, then the amplification ratio, that is to say the ratio of the actuating force to the input force, in a booster in accordance with the invention is equal to:

$$1+(Sp1/Sp0).((Sm1/Sm0)-1).$$

Under these conditions, it is evident, on the one hand, that a possible failure of the primary hydraulic circuit is not accompanied by any variation in the amplification ratio and, on the other hand, that the hydraulic sections of the movable cylinder 13 and of the secondary hydraulic piston 14 may be chosen independently of the value desired for the amplification ratio, which makes it possible to have a free choice of the length of the initial travel of the skirt for which the stop 20a encounters the rim 14a of the secondary hydraulic piston 14.

We claim:

1. A brake device for a motor vehicle, comprising, a master cylinder and a pneumatic booster, said master cylinder being filled with a brake fluid and having a first hydraulic piston for receiving an actuation force composed of an input force and a boost force to develop an output force, said pneumatic booster having a rigid casing separated in leaktight fashion into first and second chambers by means of at least one movable partition, capable, under the effect of a pressure difference established between the first and second chambers by opening a valve, said valve moving in the same direction as a pneumatic piston carrying said valve and also moving with respect to the casing, said pneumatic booster being activated by applying an input force to said control rod for opening of said valve, in order to exert the said actuation force on said lust hydraulic piston, said input force being transmitted via a reaction disk on which said pneumatic piston also bears in order to supply said hydraulic piston with a part of said actuation force, characterised in that said movable partition is mounted to slide freely with respect to said pneumatic piston, said first hydraulic piston of the master cylinder having a hollow movable cylinder secured to the movable partition and with a bore therein in which slides, in leaktight fashion and a second hydraulic piston capable of receiving at least the said input force coming from the reaction disk, said free sliding of said movable partition with respect to said pneumatic piston being limited by movement of the second hydraulic piston by said movable cylinder.

2. The brake device according to claim 1, characterisad in that said movable cylinder has an internal stop capable of interacting with said second hydraulic piston in order to drive said second hydraulic piston.

\* \* \* \* \*